Patented Sept. 15, 1953

2,652,318

UNITED STATES PATENT OFFICE 2,652,318

PROCESS FOR THE MANUFACTURE OF SOLID MATERIALS CONSISTING OF AGGREGATED SOLID PARTICLES

James Hunter McKee, Ashtead, England, assignor to C. U. R. A. Patents Limited, Leatherhead, Surrey, England, a British company No Drawing. Application November 3, 1950, Serial No. 194,038. In Great Britain November 4, 1949

19 Claims. (Cl. 44—15)

This invention relates to the manufacture of solid materials consisting of solid particles aggregated into a solid mass. The word "material" is to be understood to include the solid mass as such, and also shaped bodies or articles composed of such a mass. Solid materials of this kind are, for example, ceramic materials, including refractory materials, which require to be fired at high temperatures for their final bonding. There are also included shaped carbon bodies comprising particles of carbon aggregated into a solid mass, for example, carbon electrodes and other carbon bodies, in so far as they need to be fired at high temperatures, for example, for graphitisation. In the manufacture of such materials it is customary to work up the solid particles into a plastic composition with the addition of a temporary binding agent serving to impart sufficient strength (referred to hereinafter and in the appended claims as "green" strength) to the mass to enable it to withstand handling and to maintain its shape prior to firing.

There are also included as such solid materials those which do not require to be fired at high temperatures, and are finally bonded by a permanent binding agent. Examples of such materials are shaped carbon bodies which do not require to be fired, and fuel briquettes composed of particles of coal or other solid carbonaceous materials.

In United States application Serial No. 194,039 is described a process for the manufacture of solid materials of the kind described above, in which a so-called "coal amine digestion mixture," which is capable of being hardened by heat, is used as a temporary or permanent binding agent for the solid particles to be aggregated. The "coal amine digestion mixture" is produced by the action of an aliphatic or araliphatic amine in the liquid state upon certain carbonaceous materials referred to as "coal," whereby the amine breaks down or "digests" the internal structure of the coal wholly or to a substantial extent into particles which are of or approach colloidal dimensions. When the relative proportions of the amine to "digested" particles is such that substantially the whole of the amine present is adsorbed on the particles, the mixture is capable of being hardened by heat and constitutes the coal amine digestion mixture referred to above.

In the process of the aforesaid application a composition is prepared containing the solid particles intermixed with the coal amine digestion mixture, and the composition is heated to harden the coal amine digestion mixture at a temperature ranging from 80° C. to a temperature below the decomposition temperature of the carbonaceous material used for producing the said mixture. For preparing the composition the solid particles are mixed either with the preformed coal amine digestion mixture already containing substantially the whole of the amine adsorbed upon the digested carbonaceous particles, or with a mixture of amine and a coal leading to the formation of a coal amine digestion mixture in situ.

We have now found that for the purpose of bonding together solid particles consisting of or containing as an impurity certain carbonaceous materials an aliphatic or araliphatic amine alone can be admixed with such particles, and will act upon a small proportion of the carbonaceous material to produce an amine digestion mixture which when hardened by heat, serves as a binding agent for the solid particles.

In this specification and in the appended claims the carbonaceous materials, of which the solid particles must consist or which they may contain as an impurity, are referred to as "digestible carbonaceous materials," which expression means carbonaceous materials of metamorphosed and decayed plant origin from the rank of "dry steam" coals down to lignite and peat, especially bituminous coals, and also tarry products of the thermal decomposition of carbonaceous materials; and the expression "amine digestion mixture" is used to mean the mixture which results from the digestion of such a digestible carbonaceous material by an aliphatic or araliphatic amine in the liquid state, and in which mixture substantially the whole of the amine is adsorbed on the digested material.

Accordingly, this invention provides a process for the manufacture of solid materials consisting of aggregated solid particles, wherein a composition containing solid particles intermixed with an amine digestion mixture is prepared by mixing solid particles consisting of or containing a digestible carbonaceous material as defined above with an aliphatic or araliphatic amine, and heating the composition at a temperature ranging from 80° C. to a temperature below the decomposition temperature of the carbonaceous materials.

As stated above, there are used aliphatic or araliphatic amines. The term "araliphatic amine" is used herein to denote an amine in which an amino group is attached to the aliphatic portion of an organic residue which is partly aromatic and partly aliphatic. As especially suitable amines there may be mentioned: Primary aliphatic monamines containing not more than 12 carbon atoms, for example, n-propylamine, isopropylamine, a-methyl-propyl-amine, n-amylamine, n-dodecylamine, allylamine; alkylene diamines containing not more than 6 carbon atoms in the aliphatic chain, for example, ethylene diamine, propylene diamine or hexamethylene diamine; polyalkylene polyamines containing at least one primary amino group, for example, diethylene triamine; triethylene tetramine and tetraethylene pentamine; araliphatic amines, for example, benzylamine or β-phenylethylamine; and aliphatic hydroxy-amines containing primary, secondary or tertiary amino groups, especially monoethanolamine, diethanolamine, triethanolamine or N-hydroxyethyl-ethylene diamine. Instead of using a single amine, a mixture of two or more amines may be used.

The amine may be mixed with the solid particles in the liquid or solid state, but in the latter case it is necessary to liquefy the amine by heat after mixing, so that it can act upon the carbonaceous material to produce the amine digestion mixture. When it is desired to produce a plastic composition prior to the heat treatment a liquid amine may be used to impart the desired plasticity. Alternatively, limited proportions of other liquid diluents, for example, water, not exceeding the weight of the amine may be used for this purpose, but they must not be added before the digesting action of the amine is complete, because the presence of any diluent is detrimental to the digesting action of the amine.

The degree of hardening produced by the heat treatment is greater in the upper than in the lower part of the temperature range given above, and generally an optimum hardening results at temperatures of 200–300° C. However, the degree of hardening attained at 80° C., but advantageously at about 100° C., suffices for many purposes.

The invention can be used for making a wide variety of solid materials from solid particles consisting of or containing a digesible carbonaceous material, and in the manufacture of which the amine digestion mixture serves as a temporary or permanent binding agent. The solid particles may be those of a non-carbonaceous material containing a digestible carbonaceous material as an impurity for example, ceramic, including refractory, materials containing such an impurity. An example of such a material is the fly ash from pulverised fuel furnaces. There may also be mentioned carbon particles containing digestible carbonaceous material as an impurity, and to be used for making carbon bodies. Furthermore, particles of coal or other digestible carbonaceous material may be bonded to form fuel briquettes.

For the manufacture of solid materials, for example, ceramic, including refractory, materials, and carbon bodies, which require to be fired at high temperatures, solid particles containing a digestible carbonaceous material as an impurity are mixed with the amine, the mixture is formed into a plastic composition containing the particles intermixed with an amine digestion mixture resulting from the action of the amine on the carbonaceous material, the plastic composition is heated to impart "green" strength thereto by hardening the amine digestion mixture, and the hardened mass is fired. For making shaped bodies the plastic composition may be shaped, for example, by moulding, ramming, pressing, casting or extrusion. Heating at a temperature of about 100° C. usually suffices for imparting "green" strength.

In this manner ceramic articles, such as tiles or bricks, can be made from fly ash containing carbonaceous impurities. Fly ash may contain up to 40 per cent. of carbonaceous impurities (calculated as carbon), of which the whole or a large part is of a digestible nature. Hitherto, in using fly ash for making ceramic articles it has generally been desirable, first to remove the carbonaceous impurities by burning them out, because if they are burned out during the firing of the "green" articles there is a tendency for cracking or undue expansion to occur. In the process of the present invention these difficulties are considerably reduced or avoided, since the presence of the hardened amine digestion mixture leads to more uniform burning out of the carbon during firing.

For the manufacture of solid materials, such as carbon bodies or fuel briquettes, which do not require to be fired, and in which the solid particles are bonded together by a permanent binding agent, the solid particles consisting of or containing a digestible carbonaceous material are mixed with the amine to produce a composition containing the particles intermixed with an amine digestion mixture resulting from the action of the amine on the carbonaceous material, and the composition is heated to harden the amine digestion mixture. For producing shaped articles the composition may be shaped in the plastic state, or may be prepared in a powdered form and moulded with heat and pressure.

The following examples illustrate the invention, the parts being by weight:

*Example 1*

A tile is made as follows: 50 parts of fly ash containing 5.6 per cent. of carbonaceous impurities calculated as carbon are mixed with 8 parts of monoethanolamine. The resulting plastic mass is moulded into the form of a tile under a pressure of ½ ton per square inch. The tile is then heated at 100° C. for 12 hours, and subsequently fired at 1050° C.

*Example 2*

Bricks are made as follows: 500 parts of fly ash containing 20.3 per cent. of carbonaceous impurities calculated as carbon are mixed with 700 parts of a grog prepared from the same fly ash by calcining it and grinding the resulting aggregate to pass through a ⅛ inch sieve, the carbonaceous impurities being burned off during the calcination. The mixture is worked up into a plastic mouldable mass with the addition of 90 parts of monoethanolamine, and the mass is moulded into the form of bricks under a pressure of ½ ton per square inch. The moulded bricks are heated at 100° C. for 12 hours, and subsequently fired at 1050° C.

*Example 3*

Fuel briquettes are made as follows: A medium caking Yorkshire coal (having a carbon content of 84 per cent. according to Parr's formula, a volatile matter content of 33 per cent., and a B. S. I. swelling number of 5) is ground to pass through a 72 mesh B. S. S. sieve. 10 parts of the ground coal are mixed with 1 part of monoethanolamine or benzylamine, and the mixture is moulded into the form of oval shapes under a pressure of 2 tons per square inch. The moulded shapes are then heated at 300° C. for 2 hours. The resulting briquettes have a compressive strength of about 1000 pounds per square inch, and a good resistance to abrasion both before and after being subjected to carbonisation at 800° C.

I claim:

1. A process for the manufacture of solid materials consisting of aggregated solid particles, wherein a composition containing solid particles intermixed with an amine digestion mixture is prepared by mixing solid particles consisting of or containing a digestible carbonaceous material with an amine selected from the group consisting of aliphatic or araliphatic amines, and heating the composition at a temperature ranging from 80° C. to a temperature below the decomposition temperature of the carbonaceous material.

2. A process as claimed in claim 1, wherein solid particles are used which contain a digestible carbonaceous material as an impurity.

3. A process as claimed in claim 1, wherein the amine is a primary aliphatic monamine having not more than 12 carbon atoms.

4. A process as claimed in claim 1, wherein the amine is an aliphatic hydroxy-amine.

5. A process as claimed in claim 4, wherein the amine is selected from the group consisting of monoethanolamine, diethanolamine, triethanolamine and N-hydroxyethyl-ethylene diamine.

6. A process as claimed in claim 1, wherein the amine is an alkylene diamine having not more than 6 carbon atoms in the aliphatic chain.

7. A process as claimed in claim 6, wherein the amine is selected from the group consisting of ethylene diamine, propylene diamine and hexamethylene diamine.

8. A process as claimed in claim 1, wherein the amine is a polyalkylene polyamine containing at least one primary amino group.

9. A process as claimed in claim 8, wherein the amine is selected from the group consisting of diethylene triamine, triethylene tetramine or tetraethylene pentamine.

10. A process as claimed in claim 1, wherein the amine is selected from the group consisting of benzylamine or β-phenyl-ethylamine.

11. A process for the manufacture of fired solid materials, wherein solid particles containing a digestible carbonaceous material as an impurity are mixed with an amine selected from the group consisting of aliphatic and araliphatic amines, the mixture is formed into a plastic composition containing the particles intermixed with an amine digestion mixture resulting from the action of the amine on the carbonaceous material, the plastic composition is heated to impart "green" strength thereto by hardening the amine digestion mixture, and the hardened mass is fired.

12. A process as claimed in claim 11, wherein the solid particles are those of a ceramic material containing a digestible carbonaceous material as an impurity.

13. A process as claimed in claim 12, wherein the solid particles are of fly ash containing carbonaceous impurities.

14. A process as claimed in claim 11, wherein the solid particles are particles of carbon containing a digestible carbonaceous material as an impurity.

15. A process as claimed in claim 11, wherein the hardening treatment is carried out at a temperature of about 100° C.

16. A process for the manufacture of solid materials consisting of solid particles bonded together by a permanent binding agent, wherein solid particles containing a digestible carbonaceous material as an impurity are mixed with an amine selected from the group consisting of aliphatic and araliphatic amines to produce a composition containing an amine digestion mixture resulting from the action of the amine on the carbonaceous material, and the composition is heated to harden the amine digestion mixture.

17. A process as claimed in claim 16, wherein the hardening treatment is carried out at a temperature of 200–300° C.

18. A process as claimed in claim 16, wherein the solid particles are particles of carbon containing a digestible carbonaceous material as an impurity.

19. A process for the manufacture of fuel briquettes, wherein the particles of a solid fuel consisting of a digestible carbonaceous material are mixed with an amine selected from the group consisting of aliphatic and araliphatic amines, the mixture is formed into shaped bodies containing the particles intermixed with an amine digestion mixture resulting from the action of the amine on the carbonaceous material, and the bodies to harden the amine digestion mixture.

JAMES HUNTER McKEE.

References Cited in the file of this patent

UNITED STATES PATENTS

| Number | Name | Date |
| --- | --- | --- |
| 2,049,013 | Lowry | July 28, 1936 |
| 2,133,280 | Burk | Oct. 18, 1938 |
| 2,310,795 | La Plana et al. | Feb. 9, 1943 |
| 2,334,545 | D'Alelio | Nov. 16, 1943 |
| 2,453,543 | Schabelitz | Nov. 9, 1948 |
| 2,514,789 | Orth | July 11, 1950 |
| 2,527,596 | Shea et al. | Oct. 31, 1950 |

FOREIGN PATENTS

| Number | Country | Date |
| --- | --- | --- |
| 510,256 | Great Britain | July 31, 1939 |
| 586,538 | Great Britain | Mar. 21, 1947 |